(12) United States Patent
Takarabe

(10) Patent No.: US 8,000,185 B2
(45) Date of Patent: Aug. 16, 2011

(54) DRIVE SIGNAL GENERATION CIRCUIT

(75) Inventor: Yoshiomi Takarabe, Oizumi-machi (JP)

(73) Assignees: Sanyo Electric Co., Ltd., Osaka (JP); Sanyo Semiconductor Co., Ltd., Gumma (JP)

(*) Notice: Subject to any disclaimer, the term of this patent is extended or adjusted under 35 U.S.C. 154(b) by 357 days.

(21) Appl. No.: 12/332,932

(22) Filed: Dec. 11, 2008

(65) Prior Publication Data
US 2009/0154312 A1 Jun. 18, 2009

(30) Foreign Application Priority Data
Dec. 14, 2007 (JP) .................................. 2007-323507

(51) Int. Cl.
*G11B 7/00* (2006.01)
(52) U.S. Cl. .................................................. 369/44.29
(58) Field of Classification Search .................... None
See application file for complete search history.

(56) References Cited

U.S. PATENT DOCUMENTS

| | | | | |
|---|---|---|---|---|
| 5,142,518 A | * | 8/1992 | Hangai et al. | 369/44.35 |
| 5,335,214 A | * | 8/1994 | Matoba et al. | 369/44.28 |
| 5,703,849 A | * | 12/1997 | Noda | 369/44.29 |
| 6,762,981 B2 | * | 7/2004 | Ono | 369/44.28 |
| 7,385,886 B2 | * | 6/2008 | Yang | 369/44.25 |
| 2009/0154312 A1 | * | 6/2009 | Takarabe | 369/44.32 |

FOREIGN PATENT DOCUMENTS

| | | |
|---|---|---|
| JP | 05-144019 | 6/1993 |
| JP | 07-045023 | 2/1995 |
| JP | 2000-285487 | 10/2000 |
| JP | 2003-153569 | 5/2003 |

OTHER PUBLICATIONS

Japan Patent Office, Notification of Reasons for Rejection for Application No. 2007-323507, Mail Date Nov. 30, 2010.

* cited by examiner

*Primary Examiner* — Peter Vincent Agustin
(74) *Attorney, Agent, or Firm* — SoCal IP Law Group LLP; Steven C. Sereboff; John E. Gunther

(57) ABSTRACT

A drive signal generation circuit comprising: a tracking signal output circuit to output a tracking signal based on an error signal indicating a track deviation of laser light output from the optical pickup relative to a track, the tracking signal being a signal for driving a motor to move an optical pickup in a radial direction of an optical disc to reduce the track deviation of the laser light; a stop signal output circuit to output a stop signal for driving the motor to stop moving the optical pickup in the radial direction; and a switch circuit to output the tracking signal as a drive signal for driving the motor when a level of an output signal from the optical pickup is higher than a predetermined level, and to output the stop signal as the drive signal when the level of the output signal is lower than the predetermined level.

14 Claims, 7 Drawing Sheets

DRIVE SIGNAL GENERATION CIRCUIT

CROSS-REFERENCE TO RELATED APPLICATION

This application claims the benefit of priority to Japanese Patent Application No. 2007-323507, filed Dec. 14, 2007, of which full contents are incorporated herein by reference.

BACKGROUND OF THE INVENTION

1. Field of the Invention

The present invention relates to a drive signal generation circuit.

2. Description of the Related Art

A typical optical disc apparatus is provided with a sled motor for moving an optical pickup in a radial direction of an optical disc to read/write data from/to an optical disc such as CD (compact disc) (see, e.g., Japanese Patent Application Laid-Open Publication No. Hei7-045023 or 2003-153569.)

FIG. 7 depicts a typical sled motor control circuit 530 that drives a sled motor 520 for moving an optical pickup 500 in a radial direction of an optical disc 510. An RF amplifier 600 in the sled motor control circuit 530 outputs an RF (radio frequency) signal representing data recorded in the optical disc and a tracking error signal TE representing a tracking error based on a detection signal DET obtained by photoelectric conversion in the optical pickup 500. A defect detection circuit 610 compares a level of the input RF signal with a threshold value of a predetermined level to output a defect signal DEF indicating the presence of flaws, soil, etc., on the recording surface of the optical disc 510. A sled servo circuit 620 is a circuit that performs feedback control of the sled motor 520 so as to reduce the tracking error according to the input tracking error signal TE, and for which characteristics of a feedback loop for the feedback control of the sled motor 520 are set based on the level of the defect signal DEF (see. e.g., Japanese Patent Application Laid-Open Publication No. Hei7-045023.) Specifically, when the defect detection circuit 610 outputs the defect signal DEF indicating that no flaw, etc., exist on the recording surface of the optical disc 510, a coefficient is set for the sled servo circuit 620 so as to reduce the band of the feedback loop to reduce the power consumption of the sled servo circuit 620. On the other hand, when the defect detection circuit 610 outputs the defect signal DEF indicating that a flaw, etc., exist on the recording surface of the optical disc 510, a coefficient is set for the sled servo circuit 620 so as to increase the band of the feedback loop to accelerate the operation of the optical pickup 500. Therefore, the sled servo circuit 620 drives the sled motor 520 so as to reduce the tracking error based on the tracking error signal TE regardless of the presence of flaws, etc., on the recording surface of the optical disc 510.

The typical sled motor control circuit 530 performs feedback control of the sled motor 520 based on the tracking error signal TE. However, it is a problem that the accuracy of the tracking error signal TE input to the sled servo circuit 620 deteriorates in a period during which the defect signal DEF for indicating the presence of flaws, etc., on the recording surface of the optical disc 510 is output, and therefore, when performing the feedback control of the sled motor 520 based on the tracking error signal TE in this period, the optical pickup 500 is moved to a wrong position.

SUMMARY OF THE INVENTION

A drive signal generation circuit according to an aspect of the present invention, comprises: a tracking signal output circuit configured to output a tracking signal based on an error signal, the tracking signal being a signal for driving a motor to move an optical pickup in a radial direction of an optical disc to reduce a track deviation of laser light output from the optical pickup, the error signal being a signal indicating the track deviation, the track deviation being a deviation of the laser light with respect to a track; a stop signal output circuit configured to output a stop signal for driving the motor to stop moving the optical pickup in the radial direction; and a switch circuit configured to output the tracking signal as a drive signal for driving the motor when a level of an output signal obtained by photoelectric conversion in the optical pickup is higher than a predetermined level, and output the stop signal as the drive signal when the level of the output signal is lower than the predetermined level.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
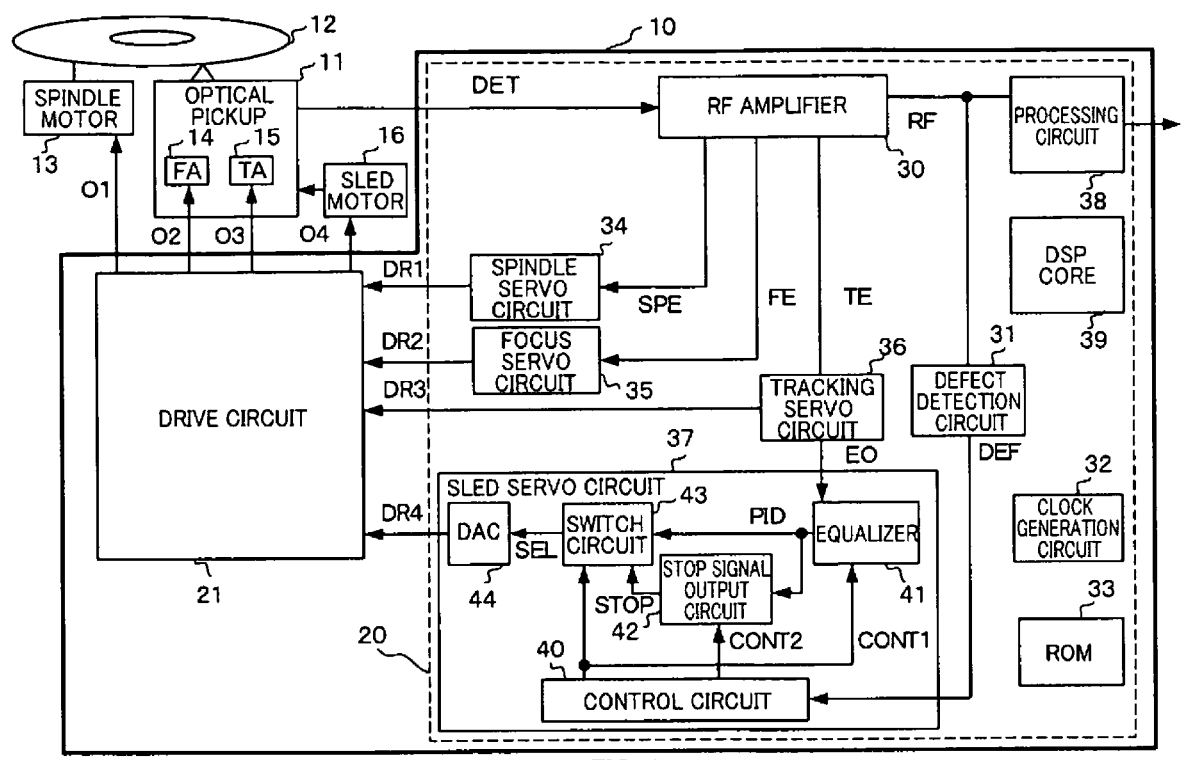
FIG. 1 is a diagram showing an optical disc apparatus control circuit 10 according to an embodiment of the present invention.

FIG. 1 depicts an optical disc apparatus control circuit 10 according to an embodiment of the present invention.

The optical disc apparatus control circuit 10 is a circuit for controlling: a spindle motor 13 that rotates an optical disc 12 based on a detection signal DET obtained by photoelectric conversion in an optical pickup 11; a focus-adjustment actuator (FA) 14 and a tracking-adjustment actuator (TA) 15 included in the optical pickup 11; and a sled motor 16 that moves the optical pickup 11 in a radial direction of the optical disc 12, and includes an optical-disc LSI (large-scale integration) 20 and a drive circuit 21. It is assumed that each of the optical-disc LSI 20 and the drive circuit 21 according to an embodiment of the present invention is an integrated circuit and that music data are recorded in the optical disc 12.

The optical-disc LSI 20 is a circuit that outputs drive signals DR1 to DR4 for controlling the spindle motor 13, the focus-adjustment actuator 14, the tracking-adjustment actuator 15, and the sled motor 16 to the drive circuit 21 based on the DET (output signal) obtained by photoelectric conversion in an optical pickup 11, that reproduces the music data recorded in the optical disc 12 as audio signals, and that outputs the reproduced audio signals to a power amplifier (not shown) for driving a speaker (not shown).

The drive circuit 21 is a circuit that respectively drives the spindle motor 13, the focus-adjustment actuator 14, the tracking-adjustment actuator 15, and the sled motor 16 with output signals O1 to O4 based on the drive signals DR1 to DR4.

There will first be given outlines of circuits included in the optical-disc LSI 20.

The optical-disc LSI 20 according to an embodiment according of the present invention includes an RF amplifier 30, a defect detection circuit 31, a clock generation circuit 32, a ROM (read only memory) 33, a spindle servo circuit 34, a focus servo circuit 35, a tracking servo circuit 36, a sled servo circuit 37, a processing circuit 38, and a DSP (digital signal processor) core 39. It is assumed that each of the spindle servo circuit 34, the focus servo circuit 35, the tracking servo circuit 36, and the sled servo circuit 37 is a digital servo circuit.

The RF amplifier 30 receives the detection signal DET output from the optical pickup 11 and outputs an RF (radio frequency) signal indicating data recorded in the optical disc 12, a spindle error signal SPE indicating an error of a rotation speed of the spindle motor 13, a focus error signal FE indicating a focus error, and a tracking error signal TE indicating a tracking error. It is assumed that the RF signal according to an embodiment of the present invention is a signal obtained by amplifying the detection signal DET by a predetermined gain.

The defect detection circuit 31 is a circuit that outputs a defect signal DEF indicating presence of a flaw, soil, etc., on a recording surface of the optical disc 12 based on the RF signal input from the RF amplifier 30. Specifically, when a flaw, etc., exist on the recording surface of the optical disc 12, the detection signal DET output from the optical pickup 11 becomes lower in level, and therefore, the RF signal accordingly becomes lower in level. On the other hand, when no flaw, etc., exist on the recording surface of the optical disc 12, the detection signal DET output from the optical pickup 11 becomes higher in level, and therefore, the RF signal accordingly becomes higher in level. Therefore, the presence of a flaw, etc., on the recording surface of the optical disc 12 can be detected by comparing a threshold value Vt of a predetermined level with a level of the RF signal level in the defect detection circuit 31. It is assumed in an embodiment of the present invention that a high-level (hereinafter, H-level) defect signal DEF is output when a flaw, etc., exist on the recording surface of the optical disc 12 and that a low-level (hereinafter, L-level) defect signal DEF is output when no flaw, etc., exist on the recording surface of the optical disc 12. The defect detection circuit 31 can be made up of such a circuit as to be shown in FIG. 2 of Japanese Patent Application Laid-Open Publication No. 2007-250046, for example.

The clock generation circuit 32 is a circuit that generates a clock signal CLK for operating each of the spindle servo circuit 34, the focus servo circuit 35, the tracking servo circuit 36, and the sled servo circuit 37, each of which is the digital servo circuit.

The ROM 33 is a circuit that stores therein various data to be used when each circuit of the spindle servo circuit 34, the focus servo circuit 35, the tracking servo circuit 36, and the sled servo circuit 37 processes input signals.

The spindle servo circuit 34 is a circuit that outputs to the drive circuit 21 the drive signal DR1 for rotating the spindle motor 13 at a constant linear velocity based on the spindle error signal SPE.

The focus servo circuit 35 is a circuit that outputs to the drive circuit 21 the drive signal DR2 for focusing laser (not shown) onto the recording surface of the optical disc 12 based on the focus error signal FE.

The tracking servo circuit 36 is a circuit that outputs to the drive circuit 21 the drive signal DR3 for driving an objective lens (not shown) in the optical pickup 11 to follow a track to reduce the tracking error based on the tracking error signal TE and that outputs to the sled servo circuit 37 an error signal EO, which is obtained by attenuating a high-frequency component of the tracking error signal TE.

The sled servo circuit 37 is a circuit that outputs to the drive circuit 21 the drive signal DR4 for reducing the tracking error based on the defect signal DEF from the defect detection circuit 31 and the error signal EO from the tracking servo circuit 36, and includes a control circuit 40, an equalizer 41, a stop signal output circuit 42, a switch circuit 43, and a DAC 44. Since operation speed required for the sled motor 16 is slower than that required for tracking-adjustment actuator 15 in an embodiment of the present invention, the sled servo circuit 37 may operate based on the error signal EO, which is obtained by attenuating the high-frequency component of the tracking error signal TE as described above. The equalizer 41, the stop signal output circuit 42, and the switch circuit 43 correspond to a drive signal generation circuit according to an embodiment of the present invention.

The processing circuit 38 is a circuit that processes the RF signal output from the RF amplifier 30 to be output as an audio signal to, for example, a power amplifier (not shown) for driving a speaker (not shown) in order to reproduce music recorded in the optical disc 12, for example.

The DSP core 39 performs control over the optical-disc LSI 20.

The drive circuit 21 is a circuit that drives each of the spindle motor 13, the focus-adjustment actuator 14 and tracking-adjustment actuator 15 included in the optical pickup 11, and the sled motor 16 with the output signals O1 to O4 based on the drive signals DR1 to DR4 from the above optical-disc LSI 20.

There will hereinafter be described a case where the optical pickup 11 sequentially reads data recorded in the optical disc 12 and it is assumed that the optical pickup 11 is moved from the inside to the outside of the optical disc 12 according to an embodiment of the present invention.

Figure 2:
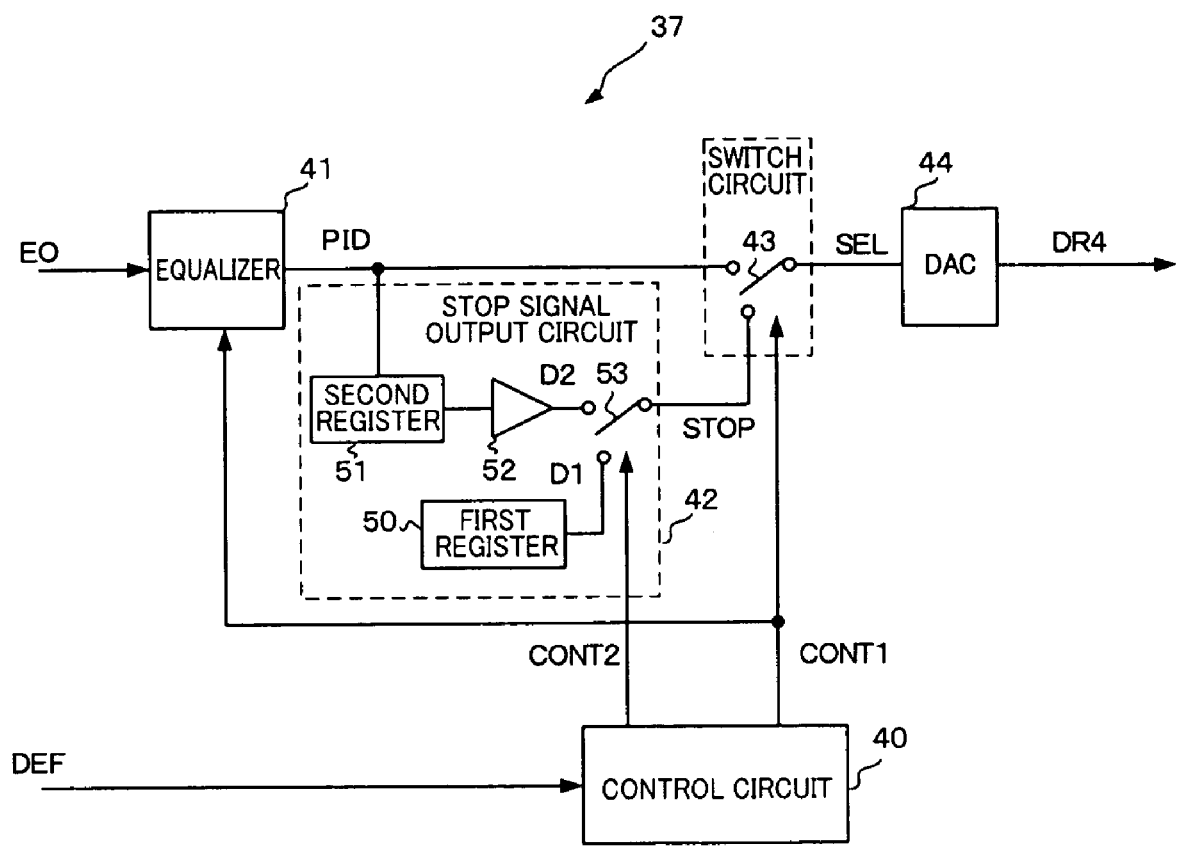
FIG. 2 is a diagram showing a sled servo circuit 37 according to an embodiment of the present invention.

An exemplary configuration of the sled servo circuit 37 will first be described with reference to FIG. 2. Since the sled servo circuit 37 according to an embodiment of the present invention is the digital servo circuit as above, it is assumed that the clock signal CLK from the clock generation circuit 32 is input to the sled servo circuit 37 and the sled servo circuit 37 operates in synchronization with the clock signal CLK although not shown in FIG. 2.

The control circuit 40 makes the switch circuit 43 described later output a signal for stopping moving the optical pickup 11 when the H-level defect signal DEF indicating that a flaw, etc., exist on the recording surface of the optical disc 12 is output, and makes the switch circuit 43 output a signal for moving the optical pickup 11 corresponding to the tracking error when the L-level defect signal DEF indicating that no flaw, etc., exist on the recording surface of the optical disc 12 is output.

The equalizer 41 (a tracking signal output circuit) is a circuit that outputs an output signal PID (a tracking signal) for performing feedback control of the sled motor 16 based on a level of a control signal CONT1 from the control circuit 40 and the error signal EO output from the tracking servo circuit 36. It is assumed that, for example, when the control signal CONT1 is low in level, the equalizer 41 of an embodiment of the present invention performs arithmetic processing for the error signal EO in synchronization with the clock signal CLK by an arithmetic expression of predetermined PID (Proportional Integral Derivative) control, to be output as the output signal PID. On the other hand, it is assumed that when the control signal CONT1 is high, inputs of the clock signal CLK and the error signal EO are stopped and a signal to be output in synchronization with the clock signal CLK that was input before the control signal CONT1 goes high is output as the output signal PID. It is assumed that such PID control arithmetic expression as to integrate the input error signal EO is set for the equalizer 41 according to an embodiment of the present invention.

The stop signal output circuit 42 is a circuit that outputs an output signal STOP (a stop signal) for stopping the sled motor 16 based on the output signal PID and a control signal CONT2 and includes a first register 50, a second register 51, a multiplication circuit 52, and a switch 53.

The first register 50 is a circuit that holds data D1 for driving the sled motor 16 to move the optical pickup 11 from the outside to the inside of the optical disc 12. In an embodiment of the present invention, it is assumed that when the optical disc LSI 20 is activated, the DSP core 39 included in the optical disc LSI 20 reads the data D1 held in the ROM 33 to be written into the first register 50, for example.

The second register 51 is a circuit that sequentially holds the output signal PID output from the equalizer 41 in synchronization with the clock signal CLK.

The multiplication circuit 52 is a circuit that multiplies the data held in the data register 51 by a predetermined rate to be output as data D2.

The switch 53 is a circuit that outputs to the switch circuit 43 the data D1 from the first register 50 as the output signal STOP when the control signal CONT2 is high in level and that outputs to the switch circuit 43 the data D2 from the multiplication circuit 52 as the output signal STOP when the control signal CONT2 is low in level, for example, and may be made up of a selector, for example.

The switch circuit 43 is a circuit that outputs to the DAC 44 the output signal STOP from the stop signal output circuit 42 as output signal SEL (drive signal), when the control signal CONT1 is high in level and that outputs to the DAC 44 the output signal PID from the equalizer 41 as the output signal SEL when the control signal CONT1 is low in level, for example, and may be made up of a selector, for example.

The DAC 44 is a circuit that converts a digital signal from the switch circuit 43 into an analog signal and, specifically, a circuit that outputs a voltage of a level based on the output signal SEL as the drive signal DR4.

Figure 3:
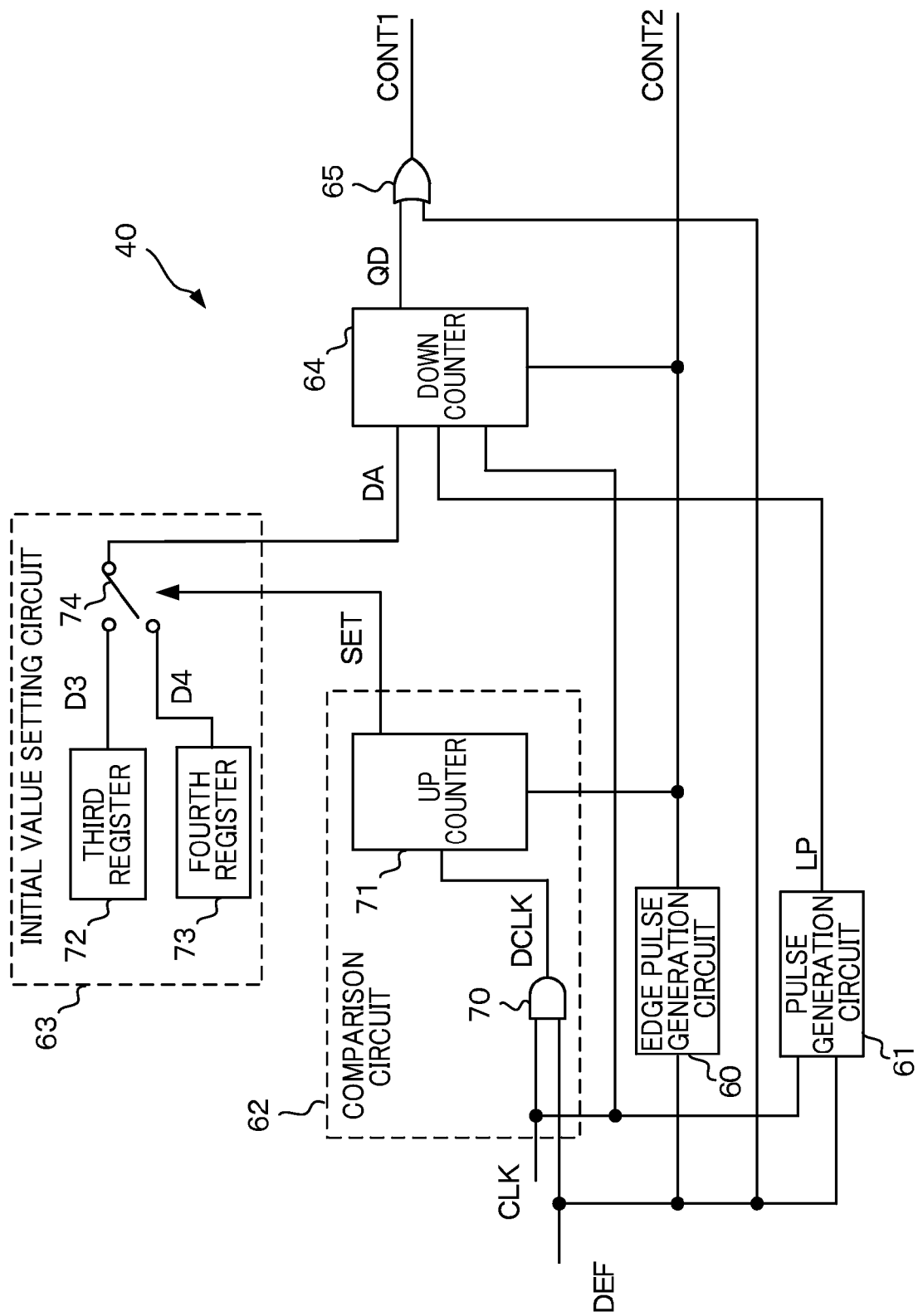
FIG. 3 is a diagram showing a control circuit 40 according to an embodiment of the present invention.

An exemplary configuration of the control circuit 40 will be described with reference to FIG. 3. The control circuit 40 includes an edge pulse generation circuit 60, a pulse generation circuit 61, a comparison circuit 62, an initial value setting circuit 63, a down counter 64, and an OR circuit 65.

An edge pulse generation circuit 60 is a circuit that detects a rising edge at which the defect signal DEF goes high from low in level, and outputs a pulse signal that is high for a predetermined period as the control signal CONT 2.

The pulse generation circuit 61 is a circuit that outputs a load pulse LP for setting an initial value of the down counter 64 described later based on the clock signal CLK only when the defect signal DEF is high in level.

The comparison circuit 62 is a circuit that compares a period during which the defect signal DEF is high with a predetermined period TA, and when the period during which the defect signal is high is longer than the predetermined period TA, an output of the comparison circuit 62 is changed from low to high in level in an embodiment of the present invention. Specifically, the comparison circuit 62 according to an embodiment of the present invention includes: an AND circuit 70 that outputs the clock signal CLK as a clock signal DCLK when the defect signal DEF is high in level; and an up counter 71 that is reset and an output thereof goes low in level when the control signal CONT 2 of H-level is input thereto, and that starts counting in synchronization with the clock signal DCLK and the output thereof goes high in level when a count value reaches a predetermined value if the control signal CONT 2 of L-level is input thereto, for example. In an embodiment of the present invention, a period TA is defined as a period from a time when the up counter 71 starts increasing the count value in synchronization with the clock signal DCLK until a time when the count value reaches the above predetermined count value.

The initial value setting circuit 63 is a circuit that sets the initial value based on a level of the output signal SET from the comparison circuit 62 for the down counter 64 described later, and includes a third register 72, a fourth register 73, and a switch 74. In an embodiment or the present invention, it is assumed that data D3 held in the third register 72 are output as data DA from the switch 74 when the output signal SET is low in level, and that data D4 held in the fourth register 73 are output as data DA from the switch 74 when the output signal SET is high in level. With regard to the third register 72 and fourth register 73 according to an embodiment of the present invention, it is assumed that when the optical disc LSI 20 is activated, the DSP core 39 reads the data held in the ROM 33 and respectively writes the data D3 and D4 into the registers 72 and 73, as is the case with the first register 50 in the sled servo circuit 37. The data D3 held in the third register 72 are such data that zero is set as the initial value of the counter 64, and the data D4 held in the fourth register 73 are such data that a predetermined count value other than zero is set as the initial value of the counter 64.

The down counter 64 is a circuit where when the control signal CONT2 is high in level, an output thereof is reset to goes low in level, and where when the control signal CONT2 is low in level, the data DA is set as an initial count value by the load pulse LP and counting down is so executed that the set count value is in synchronization with the clock signal CLK. In an embodiment of the present invention, it is assumed that when the output is reset and the count value is zero, the output is low in level; and that when the count value is not zero, the output is high in level. The output from the down counter 64 is input as an output signal QD to the OR signal 65.

The output signal QD from the down counter 64 and the defect signal DEF is input to the OR signal 65 to be output as the control signal CONT1. In an embodiment according to the present invention, it is assumed that the up counter 71 and the down counter 64 are reset when the optical disc apparatus control circuit 10 is activated.

Figure 4:
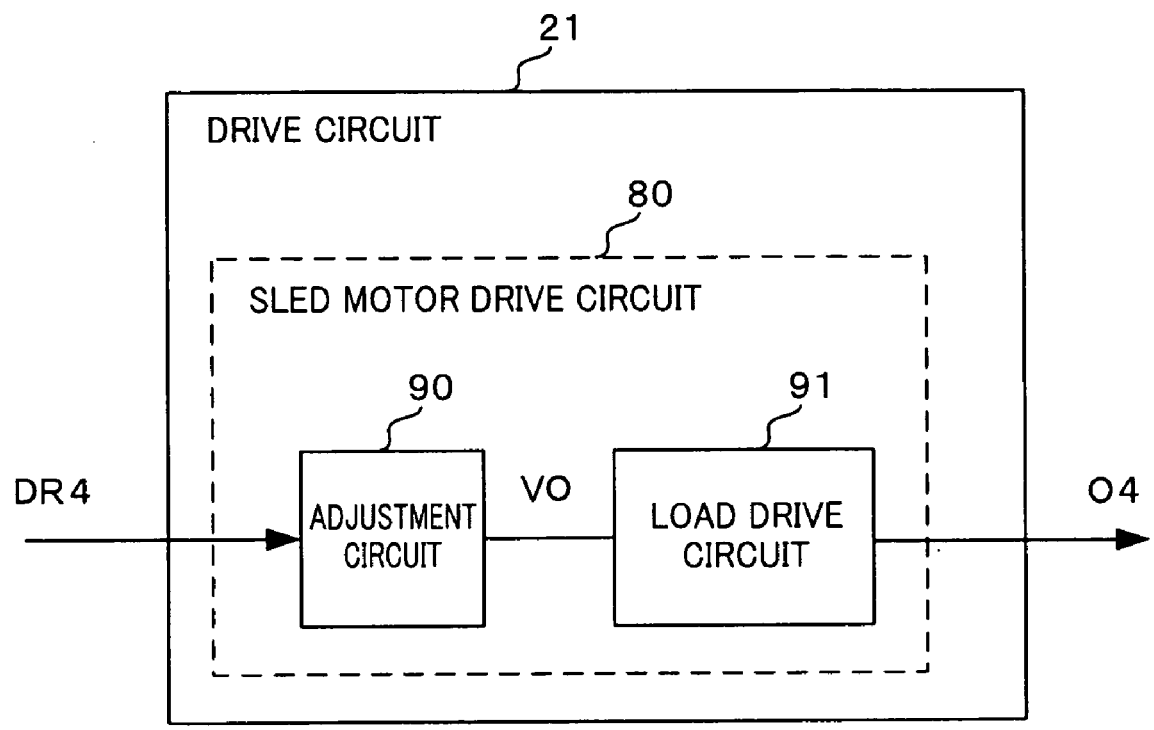
FIG. 4 is a diagram showing a sled motor drive circuit 80 according to an embodiment of the present invention.

An example of a configuration for driving the sled motor 16 in the drive circuit 21 will be described with reference to FIG. 4. The drive circuit 21 includes a sled motor drive circuit 80 for driving the sled motor 16 and the sled motor drive circuit 80 includes an adjustment circuit 90 and a load drive circuit 91.

Figure 5:
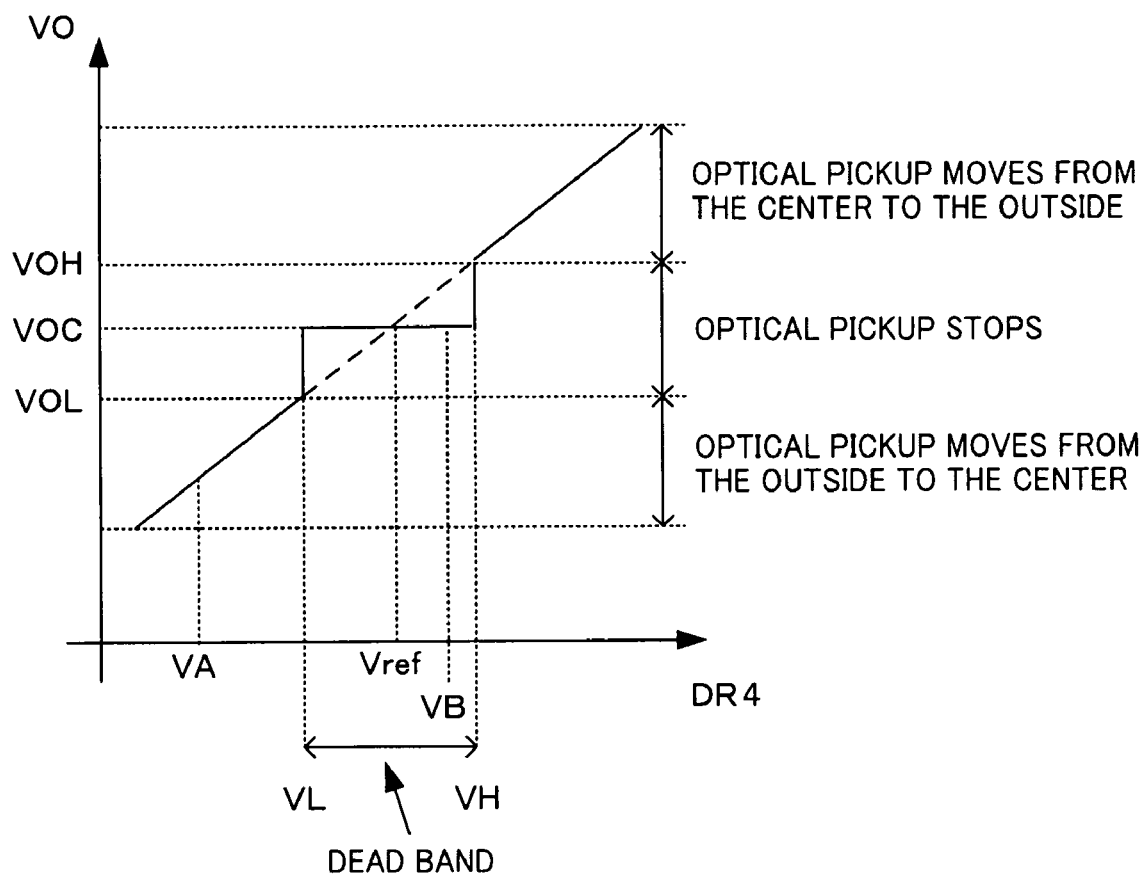
FIG. 5 is a diagram showing input/output characteristics of an adjustment circuit 90 according to an embodiment of the present invention.

The adjustment circuit 90 is a circuit that outputs an output voltage VO serving as the reference of the operation of the load drive circuit 91 based on a voltage level of the input drive signal DR4 and is assumed to have input/output characteristics exemplarily illustrated in FIG. 5 in an embodiment of the present invention. Specifically, when a voltage level of the drive signal DR4 is higher than a voltage VH, the output voltage VO increases corresponding to the level of the drive signal DR4, and when the voltage level of the drive signal DR4 is lower than the voltage VL, the output voltage VO decreases corresponding to the level of the drive signal DR4. When the level of the drive signal DR4 is within a range from the voltage VL to the voltage VH, the output voltage VO is a constant voltage VOC. In an embodiment of the present invention, the center voltage of the range from the voltage VL to the voltage VH is defined as a voltage Vref. In an embodiment of the present invention, it is assumed that the output signal PID output from the equalizer 41 in a case where the tracking error is zero is such data as to have the voltage Vref obtained as a result of conversion into the drive signal DR4 by the DAC 44. For the equalizer 41 according to an embodiment of the present invention, such PID control arithmetic expression that the input error signal EO is integrated when the tracking error increases is set as described above, and therefore, it is assumed that the level of the drive signal DR4 from the DAC 44 changes from the voltage Vref to a higher voltage as the tracking error increases from zero. The adjustment circuit 90 according to an embodiment of the present invention can be made up of a dead band circuit described in Japanese Patent Application Laid-Open Publication No. Hei8-103095.

The load drive circuit 91 is a circuit that directly drives the sled motor 16 with the output signal O4 based on the level of the output voltage VO input thereto, drives the sled motor 16 corresponding to an increase of the output voltage VO so as to move the optical pickup 11 from the center to the outside of the optical disc 12 when the output voltage VO is higher than a voltage VOH, and drives the sled motor 16 corresponding to a decrease of the output voltage VO so as to move the optical pickup 11 from the outside to the center of the optical disc 12 when the output voltage VO is lower than a voltage VOL. The load drive circuit 91 according to an embodiment of the present invention drives the sled motor 16 so as to stop moving the optical pickup 11 when the output voltage VO is a voltage VOC. Consequently, the sled motor 16 so driven as to stop moving the optical pickup 11 when the level of the drive signal DR4 input to the sled motor drive circuit 80 is within a range from the voltage VL to the voltage VH, and therefore, the range from voltage VL to the voltage VH is hereinafter referred to as a dead band in an embodiment of the present invention.

An example of the operation of the optical disc apparatus control circuit 10 will be described. There will be described, with the reference to a timing chart of main signals in the sled servo circuit 37 shown in FIG. 6, the operation of the optical disc apparatus control circuit 10 in the case where the count value based on the clock signal DCLK of the up counter 71 reaches the predetermined count while the defect signal DEF is high, i.e., the case where a period during which the defect signal DEF is high is longer than the above period TA. In an embodiment of the present invention, it is assumed that the optical disc apparatus control circuit 10 is activated before time t0 and that the defect signal DEF goes high in level at time t1 for the first time. When the optical disc apparatus control circuit 10 is activated, the equalizer 41 in the sled servo circuit 37 performs the arithmetic processing for the error signal EO corresponding to the tracking error by the arithmetic expression of the predetermined PID control, to be output as the output signal PID. Since the down counter 64 is reset as above when the optical disc apparatus control circuit 10 is activated, the control signal CONT1 output from the OR circuit 65 is low in level at time t0. Therefore, the switch circuit 43 outputs the output signal PID from the equalizer 41 as the output signal SEL. Since the DAC 44 outputs the output signal SEL as the drive signal DR4 to the sled motor drive circuit 80, the feedback control is performed for the sled motor 16 as a result.

When the defect signal DEF goes high at time t1, the control signal CONT1 output from the OR circuit 65 goes high, and therefore, the switch circuit 43 outputs the output signal STOP from the stop signal output circuit 42 as the output signal SEL. Since the control signal CONT2 goes high at time t1, the data D1 held in the first register 50 are output as the output signal STOP. It is assumed in an embodiment of the present invention that the data D1 held in the first register 50 are such data that the drive signal DR4 output from the DAC 44 has a voltage VA lower than the voltage VL as exemplarily illustrated in FIG. 5. Therefore, the drive circuit 21 outputs the output signal O4 for moving the optical pickup 11 from the outside to the center of the optical disc 12 at time t1. When the defect signal DEF goes high at time t1, the up counter 71 of the comparison circuit 62 shown in FIG. 3 starts counting up in synchronization with the clock signal DCLK. Since the up counter 71 does not reach the predetermined count value after reset, the output signal SET is low. Therefore, the data D3 indicating zero held in the third register 72 are set for the down counter 64 in synchronization with the load pulse LP.

When the control signal CONT2 goes low at time t2, one end of the switch 53 is connected to the multiplication circuit 52 from the first register 50, and therefore, the stop signal output circuit 42 outputs the data D2 from the multiplication circuit 52 as the output signal STOP to the switch circuit 43. It is assumed that the multiplication circuit 52 according to an embodiment of the present invention for which such a predetermined rate is set that the drive signal DR4 output from the DAC 44 falls within a range from the voltage Vref to the voltage VH in the dead band exemplarily illustrated in FIG. 5, regardless of the level of the input signal. It is hereinafter assumed in an embodiment of the present invention that the data D2 output from the multiplication circuit 52 at time t2 are such data that a voltage of the drive signal DR4 output from the DAC 44 is a voltage VB exemplarily illustrated in FIG. 5. When the count value of the up counter 71 reaches the predetermined count at time t3, the output signal SET from the up counter 71 goes to high from low in level. The predetermined count value held in the fourth register 73 in synchronization with the load pulse LP is set for the down counter 64 as the initial value of the down counter 64. The set count value is reduced in synchronization with the clock signal CLK. However, in an embodiment of the present invention, since the load pulse LP is input before the set count value reaches zero, although the count value of the down counter 64 starts decreasing in synchronization with the clock signal CLK in the period during which the defect signal DEF is H-level and the load pulse LP is output, the count value is reset to the initial value in synchronization of the load pulse LP. After the predetermined count value is set for the down counter 64 in synchronization with the load pulse LP at time t5, when the defect signal DEF goes low at time t6, the output of the load pulse LP is stopped. Therefore, after time t5, the count value of the down counter 64 is continuously reduced in synchronization with the clock signal CLK. The control signal CONT1 goes low at time t7 when the count value of the down counter 64 becomes zero. Assuming that a period TB is a period during which the down counter 64 counts from the above predetermined count value set therefor to zero in synchronization with the clock signal CLK in an embodiment of the present invention, the control signal CONT1 can be turned to high in level for a predetermined period corresponding to the period TB after the defect signal DEF goes low in an embodiment of the present invention. Therefore, the drive signal DR4 from the DAC 44 stays at the voltage VB from time t2 to time t7. Both the defect signal DEF and the output signal QD of the down counter 64 are low in level after time t7 and the control signal CONT1 from the OR circuit 65 is low, and therefore, the feedback control is performed for the sled motor 16 with the output signal PID from the equalizer 41 as is the case of time t0 described above.

There will then be described the operation of the optical disc apparatus control circuit 10 in the case where the count value based on the clock signal DCLK of the up counter 71 does not reach the predetermined count while the defect signal DEF is high, i.e., the case where the period during which the defect signal DEF is high in level is shorter than the above period TA. When the defect signal DEF changes in level from low to high, the drive signal DR4 is output from time t1 exemplarily illustrated in FIG. 6 as is the case where the period during which the defect signal DEF is high in level is longer than the period TA. Although the up counter 71 increases the count value in synchronization with the clock signal DCLK after time t2, the output signal SET of the up counter 71 stays low since the clock signal DCLK does not reach the predetermined count. Therefore, since zero held in the third register 72 is set as the initial value of the down counter 64 in synchronization with the load pulse LP, the output signal QD of the down counter 64 is always low in level. Therefore, the control signal CONT1 from the OR circuit 65 changes corresponding to the defect signal DEF. The period during which the control signal CONT1 is high is identical to the period during which the defect signal is high, and only while the defect signal DEF is high, the output signal STOP from the stop signal output circuit 42 is output as the output signal SEL from the switch circuit 43. When the defect signal DEF goes low, the output signal PID from the equalizer 41 is output as the output signal SEL from the switch circuit 43.

Figure 6:
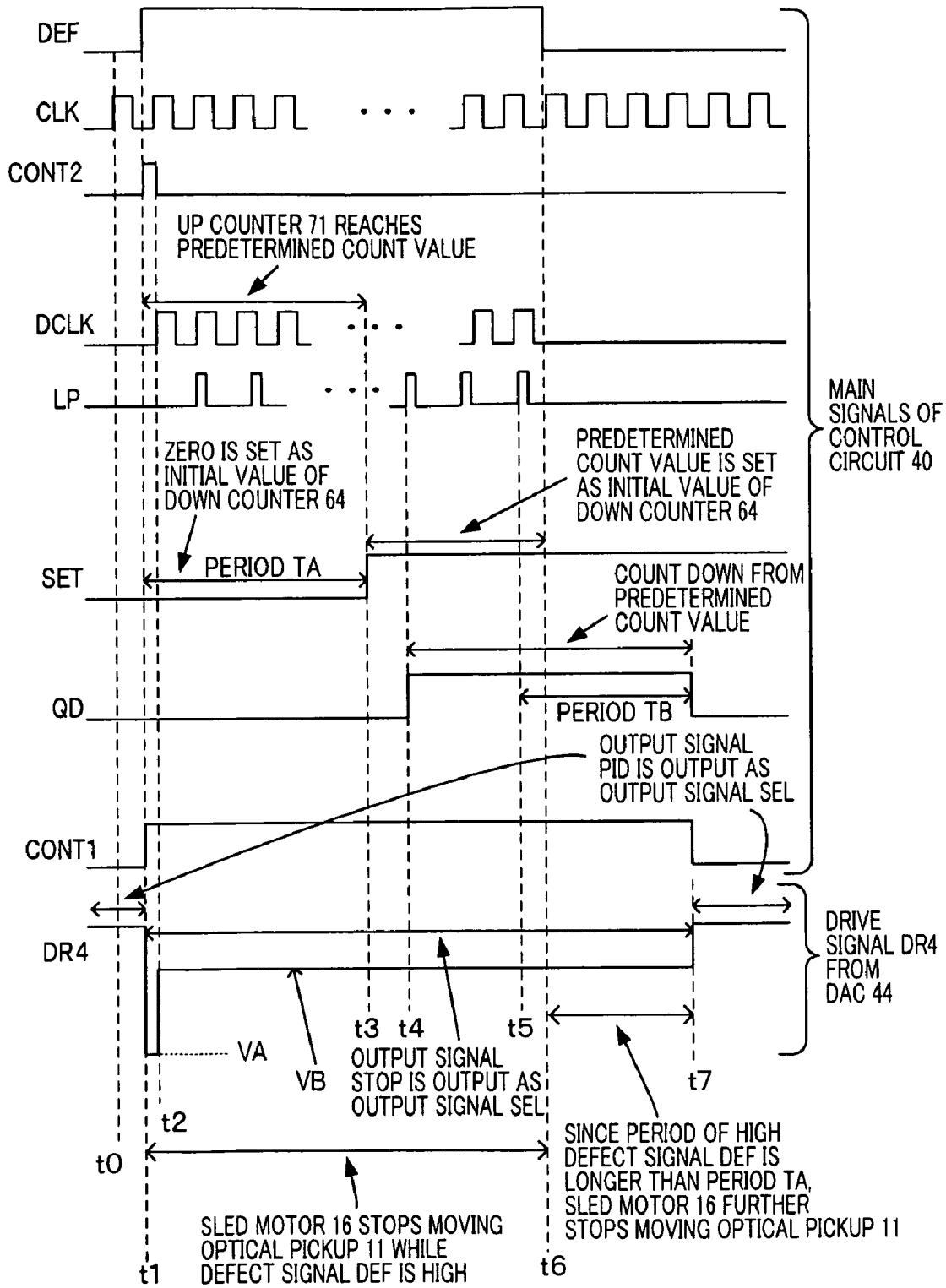
FIG. 6 is a timing chart for explaining an operation of a sled servo circuit 37 according to an embodiment of the present invention.
Figure 7:
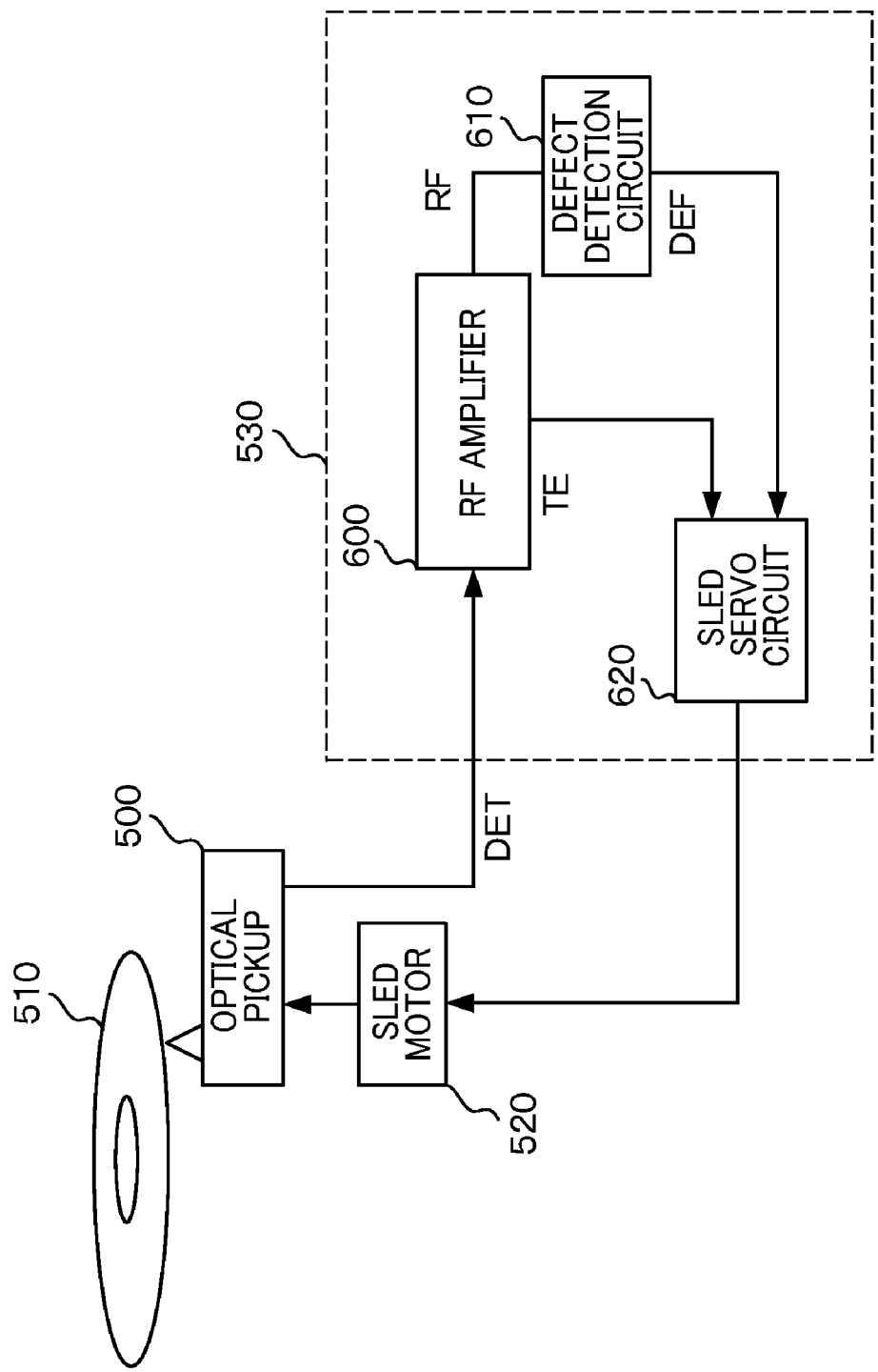
FIG. 7 is a diagram showing a configuration of a typical sled servo circuit.

In the optical disc apparatus control circuit 10 according to the present invention with the configuration described above, for example, as exemplarily illustrated in FIG. 6, when the defect signal DEF goes high at time t1, the control signal CONT1 of the control circuit 40 goes high and the sled motor 16 is driven by the output signal O4 corresponding to the output signal STOP. Therefore, when the defect signal DEF indicating the presence of a flaw, etc., on the recording surface of the optical disc 12 is detected, the sled motor 16 is so driven as to stop moving the optical pickup 11, and therefore, erroneous movement of the optical pickup 11 can be restrained.

In general, when a major flaw exists on the recording surface of the optical disc 12 and the optical pickup 11 detects the major flaw so that the defect signal DEF goes high, it tends to take time to stabilize the tracking error signal TE still after the defect signal DEF goes low. In an embodiment of the present invention, since the control signal CONT1 is high in level until time t7 when the count value of the down counter 64 becomes zero still after the defect signal DEF goes low, the sled motor 16 is so driven as to stop moving the optical pickup 11. Therefore, control of the optical pickup 11 can be improved.

In general, among flaws and soil on the recording surface of the optical disc 12, in a case of soil by fingerprints, fine flaws, etc., the defect signal DEF is high for a shorter period, and in a case of major flaws the defect signal DEF is high for a longer period. Furthermore, in the case of soil by fingerprints, etc., the processing circuit 38 is more likely to output normal audio signals after processing the RF signals from the RF amplifier 30, as compared to the case of the major flaws. Therefore, in the case that the defect signal DEF is high for a shorter period, when the defect signal DEF goes low, the output signal PID from the equalizer 41 is required to be selected to move the optical pickup 11. An embodiment of the present invention includes the comparison circuit 62 that compares the period during which the defect signal DEF is high in level with the predetermined period TA, and when the period during which the defect signal DEF is high in level is shorter than the period TA, the defect signal DEF serves as the control signal CONT1, and the sled motor 16 is subjected to the feedback control is performed for the sled motor 16 with the output signal PID based on an falling edge of the defect signal DEF. On the other hand, when the period during which the defect signal DEF is high in level is longer than the period TA, i.e., it is assumed that the defect signal DEF detects a major flaw on the recording surface of the optical disc 12, the control signal CONT1 stays high for a period longer by the period TB than the period during which the defect signal DEF is high as described above. Therefore, the optical disc apparatus control circuit 10 in an embodiment of the present invention can increase an efficiency of reading data recorded in the optical disc 12. When zero is set as the initial value of the down counter 64, the initial value of the down counter 64 is set in synchronization with the load pulse LP while the defect signal DEF is high, in an embodiment of the present invention. Therefore, for example, as compared to a case where the defect signal DEF goes low and then zero is set as the initial value of the down counter 64 in synchronization with the clock signal CLK to start the counting operation, the level of the control signal CONT1 can be changed without a time lag.

Such a PID control arithmetic expression that the input error signal EO is integrated when the tracking error increases is set for the equalizer 41 according to an embodiment of the present invention. Therefore, the voltage of the drive signal DR4 output from the DAC 44 increases as the tracking error increases. It can be understood, for example, that when the level of the drive signal DR4 of the DAC 44 at time t0 is close to the voltage VH that is the upper limit of the dead band, the tracking error is large, and when the tracking error further increases, the optical pickup 11 is required to be moved. In an embodiment according to the present invention, a level of the output signal PID output at time t0 is multiplied by a predetermined rate to obtain the data D2 at time t2. Therefore, for example, as exemplarily illustrated in FIG. 5, since the voltage output from the DAC 44 is the voltage VB, the drive signal DR4 may fall within the range of the dead band to be able to stop moving the optical pickup 11 with reliability, and when the control signal CONT1 indicating that the feedback control can be resumed goes low, the integration is resumed using the voltage VB as the initial value and, so that the optical pickup 11 can be moved in a short time.

For example, when the voltage of the drive signal DR4 of the DAC 44 becomes close to the voltage VH at time t0, which is the upper limit of the dead band, as a result of the increase of the tracking error, the drive signal DR4 may exceed the voltage VH resulting in movement of the optical pickup 11, even if the defect signal DEF goes high. In the sled servo circuit 37 according to an embodiment of the present invention, even if the optical pickup 11 is erroneously moved as above, the drive signal DR4 for causing the optical pickup 11 to move in a reverse direction is output from time t1 to time t2, so that the sled motor 16 is rotated in a reverse direction, and therefore, the optical pickup 11 can be stopped with reliability.

For example, in an embodiment of the present invention there is provided the comparison circuit 62 for comparing the period during which the defect signal DEF is high with the period TA, however, when the optical discs 12 having many flaws on the recording surface are often reproduced, a configuration can be made such that the comparison circuit 62 is not provided and a predetermined count value is always set for the down counter 64.

Although the switch circuit 43 is included in an embodiment of the present invention, a configuration can be made such that a switch is provided, instead of the switch circuit 43, on each output unit of the equalizer 41 and the stop signal output circuit 42, which is capable of complementary output control of the equalizer 41 and the stop signal output circuit 42 based on the level of the control signal CONT1, for example.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A drive signal generation circuit comprising:
  a tracking signal output circuit configured to output a tracking signal based on an error signal, the tracking signal being a signal for driving a motor to move an optical pickup in a radial direction of an optical disc to reduce a track deviation of laser light output from the optical pickup, the error signal being a signal indicating the track deviation, the track deviation being a deviation of the laser light with respect to a track;
  a stop signal output circuit configured to output a stop signal for driving the motor to stop moving the optical pickup in the radial direction;
  a switch circuit configured to output the tracking signal as a drive signal for driving the motor when a level of an output signal obtained by photoelectric conversion in the optical pickup is higher than a predetermined level, and output the stop signal as the drive signal when the level of the output signal is lower than the predetermined level; and
  a comparison circuit configured to output a comparison signal of one logic level when a period during which the level of the output signal is lower than the predetermined level is shorter than a predetermined reference period, and output the comparison signal of the other logic level when the period during which the level of the output signal is lower than the predetermined level is longer than the reference period, wherein
  when the level of the output signal is higher than the predetermined level, the switch circuit outputs the tracking signal as the drive signal in a case where the comparison circuit outputs the comparison signal of the one logic level, and outputs the tracking signal as the drive signal after a predetermined period elapses in a case where the comparison circuit outputs the comparison signal of the other logic level.

2. A drive signal generation circuit, comprising:
  a tracking signal output circuit configured to output a tracking signal based on an error signal, the tracking signal being a signal for driving a motor to move an optical pickup in a radial direction of an optical disc to reduce a track deviation of laser light output from the optical pickup, the error signal being a signal indicating the track deviation, the track deviation being a deviation of the laser light with respect to a track;
  a stop signal output circuit configured to output a stop signal for driving the motor to stop moving the optical pickup in the radial direction; and
  a switch circuit configured to output the tracking signal as a drive signal for driving the motor when a level of an output signal obtained by photoelectric conversion in the optical pickup is higher than a predetermined level, and output the stop signal as the drive signal when the level of the output signal is lower than the predetermined level, wherein
  when a level of the drive signal from the switch circuit is within a predetermined range, the motor is driven to stop moving the optical pickup in the radial direction, and wherein
  when the level of the output signal is lower than the predetermined level, the stop signal output circuit outputs as the stop signal a signal obtained by multiplying the tracking signal by a predetermined rate so that the level of the drive signal falls within the predetermined range.

3. The drive signal generation circuit of claim 2, wherein
  when the level of the output signal is higher than the predetermined level, the switch circuit outputs the tracking signal as the drive signal after a predetermined period elapses.

4. The drive signal generation circuit of claim 2, further comprising:
  a comparison circuit configured to output a comparison signal of one logic level when a period during which the level of the output signal is lower than the predetermined level is shorter than a predetermined reference period, and output the comparison signal of the other logic level when the period during which the level of the output signal is lower than the predetermined level is longer than the reference period, wherein
  when the level of the output signal is higher than the predetermined level, the switch circuit outputs the tracking signal as the drive signal in a case where the comparison circuit outputs the comparison signal of the one logic level, and outputs the tracking signal as the drive signal after a predetermined period elapses in a case where the comparison circuit outputs the comparison signal of the other logic level.

5. A drive signal generation circuit, comprising:
  a tracking signal output circuit configured to output a tracking signal based on an error signal, the tracking signal being a signal for driving a motor to move an optical pickup in a radial direction of an optical disc to reduce a track deviation of laser light output from the optical pickup, the error signal being a signal indicating the track deviation, the track deviation being a deviation of the laser light with respect to a track;
  a stop signal output circuit configured to output a stop signal for driving the motor to stop moving the optical pickup in the radial direction; and
  a switch circuit configured to output the tracking signal as a drive signal for driving the motor when a level of an output signal obtained by photoelectric conversion in the optical pickup is higher than a predetermined level, and output the stop signal as the drive signal when the level of the output signal is lower than the predetermined level, wherein
  the motor is driven to stop moving the optical pickup in the radial direction when a level of the drive signal from the switch circuit is within a predetermined range, and is driven to move the optical pickup in the radial direction corresponding to the level of the drive signal when the level of the drive signal from the switch circuit is out of the predetermined range, and wherein
  when the level of the output signal is lower than the predetermined level, the stop signal output circuit changes a level of the stop signal to rotate the motor in a reverse direction for a predetermined period.

6. The drive signal generation circuit of claim 5, wherein when the level of the output signal is higher than the predetermined level, the switch circuit outputs the tracking signal as the drive signal after a predetermined period elapses.

7. The drive signal generation circuit of claim 5, further comprising:
a comparison circuit configured to output a comparison signal of one logic level when a period during which the level of the output signal is lower than the predetermined level is shorter than a predetermined reference period, and output the comparison signal of the other logic level when the period during which the level of the output signal is lower than the predetermined level is longer than the reference period, wherein
when the level of the output signal is higher than the predetermined level, the switch circuit outputs the tracking signal as the drive signal in a case where the comparison circuit outputs the comparison signal of the one logic level, and outputs the tracking signal as the drive signal after the predetermined period elapses in a case where the comparison circuit outputs the comparison signal of the other logic level.

8. The drive signal generation circuit of claim 5, wherein when a level of the drive signal from the switch circuit is within a predetermined range, the motor is driven to stop moving the optical pickup in the radial direction, and wherein
when the level of the output signal is lower than the predetermined level, the stop signal output circuit outputs as the stop signal a signal obtained by multiplying the tracking signal by a predetermined rate so that the level of the drive signal falls within the predetermined range.

9. A drive signal generation circuit, comprising:
a tracking signal output circuit configured to output a tracking signal based on an error signal, the tracking signal being a signal for driving a motor to move an optical pickup in a radial direction of an optical disc to reduce a track deviation of laser light output from the optical pickup, the error signal being a signal indicating the track deviation, the track deviation being a deviation of the laser light with respect to a track;
a stop signal output circuit configured to output a stop signal for driving the motor to stop moving the optical pickup in the radial direction;
a switch circuit configured to output the tracking signal as a drive signal for driving the motor when a level of an output signal obtained by photoelectric conversion in the optical pickup is higher than a predetermined level, and output the stop signal as the drive signal when the level of the output signal is lower than the predetermined level; and
a defect signal output circuit configured to output a defect signal having one logic level when the level of the output signal is higher than the predetermined level and having the other logic level when the level of the output signal is lower than the predetermined level, wherein
the switch circuit outputs the tracking signal as the drive signal for driving the motor when the defect signal has the one logic level, and outputs the stop signal as the drive signal when the defect signal has the other logic level.

10. The drive signal generation circuit of claim 9, wherein when the level of the output signal is higher than the predetermined level, the switch circuit outputs the tracking signal as the drive signal after a predetermined period elapses.

11. The drive signal generation circuit of claim 9, further comprising:
a comparison circuit configured to output a comparison signal of one logic level when a period during which the level of the output signal is lower than the predetermined level is shorter than a predetermined reference period, and output the comparison signal of the other logic level when the period during which the level of the output signal is lower than the predetermined level is longer than the reference period, wherein
when the level of the output signal is higher than the predetermined level, the switch circuit outputs the tracking signal as the drive signal in a case where the comparison circuit outputs the comparison signal of the one logic level, and outputs the tracking signal as the drive signal after a predetermined period elapses in a case where the comparison circuit outputs the comparison signal of the other logic level.

12. The drive signal generation circuit of claim 9, wherein when a level of the drive signal from the switch circuit is within a predetermined range, the motor is driven to stop moving the optical pickup in the radial direction, and wherein
when the level of the output signal is lower than the predetermined level, the stop signal output circuit outputs as the stop signal a signal obtained by multiplying the tracking signal by a predetermined rate so that the level of the drive signal falls within the predetermined range.

13. The drive signal generation circuit of claim 12, wherein when the level of the output signal is higher than the predetermined level, the switch circuit outputs the tracking signal as the drive signal after a predetermined period elapses.

14. The drive signal generation circuit of claim 9, wherein the motor is driven to stop moving the optical pickup in the radial direction when a level of the drive signal from the switch circuit is within a predetermined range, and is driven to move the optical pickup in the radial direction corresponding to the level of the drive signal when the level of the drive signal from the switch circuit is out of the predetermined range, and wherein
when the level of the output signal is lower than the predetermined level, the stop signal output circuit changes a level of the stop signal to rotate the motor in a reverse direction for a predetermined period.

* * * * *